United States Patent [19]

Thomas, Jr. et al.

[11] Patent Number: 4,502,248
[45] Date of Patent: Mar. 5, 1985

[54] SLIDING VENT WINDOW

[75] Inventors: John F. Thomas, Jr.; Cleon C. Morgan, both of Holland, Mich.

[73] Assignee: Donnelly Corporation, Holland, Mich.

[21] Appl. No.: 433,403

[22] Filed: Oct. 8, 1982

[51] Int. Cl.³ ............................................. E05F 11/38
[52] U.S. Cl. ...................................... 49/374; 49/428; 49/450
[58] Field of Search .................. 49/374, 428, 450, 449

[56] References Cited

U.S. PATENT DOCUMENTS 1,725,365  8/1929  Mohun et al. .................... 49/450 X
3,383,800  5/1968  Sturtevant ............................ 49/428

FOREIGN PATENT DOCUMENTS 1190350  5/1970  United Kingdom .................. 49/374

Primary Examiner—Kenneth Downey
Attorney, Agent, or Firm—Price, Heneveld, Huizenga & Cooper

[57] ABSTRACT

The specification discloses a vehicle window assembly including a slidable window glass supported by and guided along only one edge of the glass. More specifically, the assembly comprises a window glass, a molded guide bonded to one edge of the glass, and a pillar defining a channel in which the guide is slidingly received. The pillar and guide cooperate to permit the guide to move axially within the channel and to prevent the guide from passing transversely out of the channel so that the window glass must travel in a linear path. Also disclosed is a latch supported by the glass and extending through the guide. The latch includes an actuating portion located outside the pillar and a catch portion located and hidden within the pillar.

36 Claims, 10 Drawing Figures

SLIDING VENT WINDOW

BACKGROUND OF THE INVENTION

The present invention relates to vehicle windows, and more particularly to sliding vehicle windows.

An automotive vehicle typically includes a variety of windows about the perimeter of the passenger compartment both to enable the driver and other passengers a view out of the compartment and to provide decorative and styling aspects to the vehicle. The windows may be either fixedly mounted (e.g., windshields and rear windows), pivotally mounted (e.g., push-out vents and push-out rear quarter panel windows), or slidingly mounted (e.g., side windows in doors). Additionally, the windows may be clear, tinted, tinted only along the upper edge, or smoked, depending upon the sun-reflective properties, privacy, and decorative requirements for a particular vehicle.

Of particular importance, is the inclusion of sliding windows movable between closed positions wherein the vehicle compartment is sealed and open positions increasing air exchange through the vehicle and permitting the driver and passengers to reach out of the vehicles to pay tolls, conduct drive-up banking, make payments in parking garages, and other activities requiring the passengers to reach out of the vehicle. However, known sliding windows are not without their drawbacks.

One known sliding window includes a pair of opposed parallel guides supported by the vehicle in which opposite edges of the window slide during movement. Typically, a movement mechanism, such as a hand-operated crank, is included to facilitate movement of the glass within the guides between open and closed positions. An example of this type of assembly is disclosed in U.S. Pat. No. 2,658,791, entitled NO-DRAFT, ARM SIGNALING VEHICLE WINDOW, and issued Nov. 10, 1953, to Anderson. However, this type of arrangement cannot be used for vehicle windows which do not include a pair of opposed parallel sides to ride in the parallel channels. Specifically, this configuration cannot be used for a vent window in the front doors of a vehicle, wherein the vent window is triangularly shaped (i.e., does not include a pair of parallel edges).

A second sliding window assembly requires a movement mechanism including a portion fixedly secured to the glass to carry the glass through a predetermined path such that the glass is guided by the movement mechanism and not by any track assembly. However, these mechanisms are relatively complicated and accordingly expensive. Further, the intricate mechanisms are subject to failure.

Although pivotal vent windows have long been included in vehicles, these are unacceptable in certain situations because of aesthetics and design considerations. Additionally, pivotal vent windows are considered undesirable now by many potential vehicle purchasers because such windows are perceived to impart an inexpensive appearance to the car.

SUMMARY OF THE INVENTION

The aforementioned problems are solved by the present invention in which a sliding window assembly is provided enabling the window glass to be slidably mounted in a vehicle utilizing a single edge of the glass such that the glass is guided for movement along a predetermined linear path. More specifically, the assembly includes a pillar supported by the vehicle, a channel defined in the pillar, a window glass, and a molded guide member fixedly secured to one edge of the glass and slidably positioned within the channel. At least one of the channel and guide member includes structure permitting the guide member to slide axially within the channel and preventing the guide member from shifting transversely out of the channel. Consequently, the guide member can be moved only along a predetermined linear path defined by the channel. Because the guide member is fixedly secured to the window glass, the glass can also move only along a predetermined linear path with the guide member.

The present invention provides a simple and inexpensive solution to the problem of mounting a window, such as a vent window, for sliding movement in a vehicle wherein the window glass is shaped so as to be incapable of riding in parallel track members. Specifically, the window assembly of the present invention can be employed to mount a triangularly shaped vent window for sliding movement at far less cost over known assemblies.

In a second aspect of the invention, a latching mechanism is further provided and bonded directly to the window glass for movement therewith. The mechanism includes an actuating portion located outside the channel and a catch portion extending through the molded guide member into the channel for cooperation with the pillar to secure the window in at least its raised, or closed, position. Therefore, the latch can be operated by an easily accessible member located outside the channel; however, the catch mechanism is hidden within the channel to provide an aesthetically pleasing appearance. Further, by extending through the guide member, the latching mechanism can ride with the guide member and window glass within the channel without special structure being required on the pillar for receiving the latching mechanism.

These and other objects, advantages, and features of the invention will be more readily understood and appreciated by reference to the written specification and appended drawings.

DESCRIPTION OF THE PREFERRED EMBODIMENT

Figure 1:
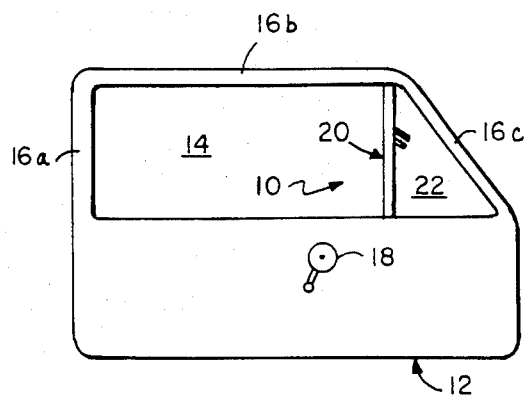
FIG. 1 is an elevational view of the interior side of the driver's door in an automotive vehicle having the sliding window assembly of the present invention installed therein.

A sliding vent window assembly constructed in accordance with a preferred embodiment of the invention is illustrated in the drawings and generally designated 10. More particularly, assembly 10 is adapted for installation in vehicle door 12 immediately forward of side window 14 (FIG. 1). Door 12 includes window frame 16 comprising rear frame member 16a, top frame member 16b disposed at a right angle to member 16a, and forward frame member 16c disposed at an oblique angle to top member 16b. As is well known, side window 14 is typically mounted for vertical movement within door 12 and frame 16 and is operated by handcrank 18. Alternatively, frame 16 can be eliminated from door 12 so that both of windows 14 and 22 interfit with the car body rather than a frame on the door.

Figure 3:
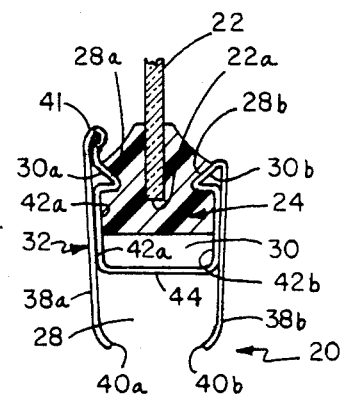
FIG. 3 is a fragmentary sectional view taken along plane III—III in FIG. 2.
Figure 2:
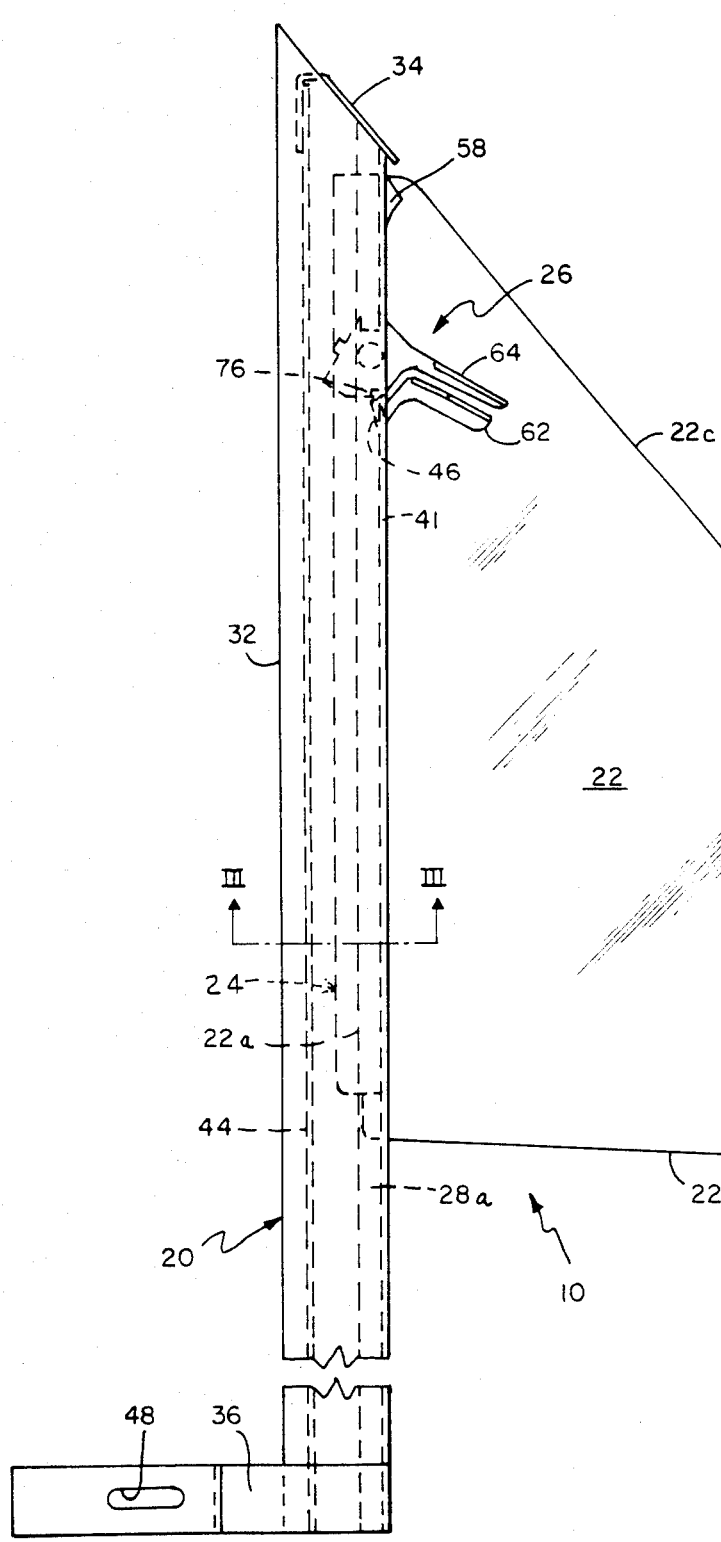
FIG. 2 is a fragmentary elevational view of the window assembly.

Window assembly 10 comprises pillar 20, window glass 22, guide member 24 fixedly secured to the window glass, and latching mechanism 26 also secured to the window glass (FIG. 2). Pillar 20 defines a pair of back-to-back channels or tracks 28 and 30 (FIG. 3). Side window glass 14 rides within a track (not visible) in frame member 16a and in the channel 28 parallel to track member 16a. Pillar 20 includes a pair of opposed ribs 28a and 28b, which together define a restricted opening to track 30. Guide member 24 defines a pair of parallel grooves 30a and 30b (see also FIG. 8) which receive ribs 30a and 30b so that pillar 20 and guide 24 cooperate to retain the guide member within channel 20. Consequently, guide member 24 can slide axially within channel 30 but is prevented from shifting radially or transversely out of the channel due to the cooperation of ribs 28 and grooves 30. Window glass 22 can thus be moved along a predetermined linear path by sliding guide member 24 within pillar 20 so that the window moves between a raised (closed) position illustrated in FIG. 2, and a lowered (open) position. The unique cooperating guide member and channel of the present invention permit the window to be firmly and accurately guided from only one side of the window glass along a predetermined path.

Pillar 20 (FIGS. 2, 3, and 4) is a metal roll-formed piece (22 gauge HR P+O in the preferred embodiment) fixedly secured within vehicle door 12. Included within pillar 20 are body portion 32, upper mounting bracket 34, and lower mounting bracket 36. Body 32 includes a pair of opposed sidewalls 38a and 38b each terminating in free edges 40a and 40b, respectively, which turn inwardly slightly toward one another. Sidewall 38b is rolled back upon itself to define rib 28b generally triangular in cross section, channel sidewall 42b lying adjacent sidewall 38b, and ultimately rear wall 44. Similarly, sidewall 38a is bent back upon itself to define hiding flange 41, rib 28a generally triangular in cross section, sidewall 42a lying adjacent sidewall 38a, and ultimately rear channel wall 44. Consequently, channel 30 is defined by sidewalls 42 and rear wall 44. The longitudinal ribs 28 extend inwardly toward one another to define a restricted opening to channel 30. Keeper 46 (FIGS. 2 and 4) is formed by cutting a small portion of hiding flange 41 and bending that portion inwardly toward rib 28a to provide a keeper for latching mechanism 26 as will be described. Lower mounting bracket 36 is fixedly secured to the lower end of pillar 20, for example by welding, and defines an aperture 48 through which a fastener may be inserted to secure the pillar to door 12.

Figure 4:
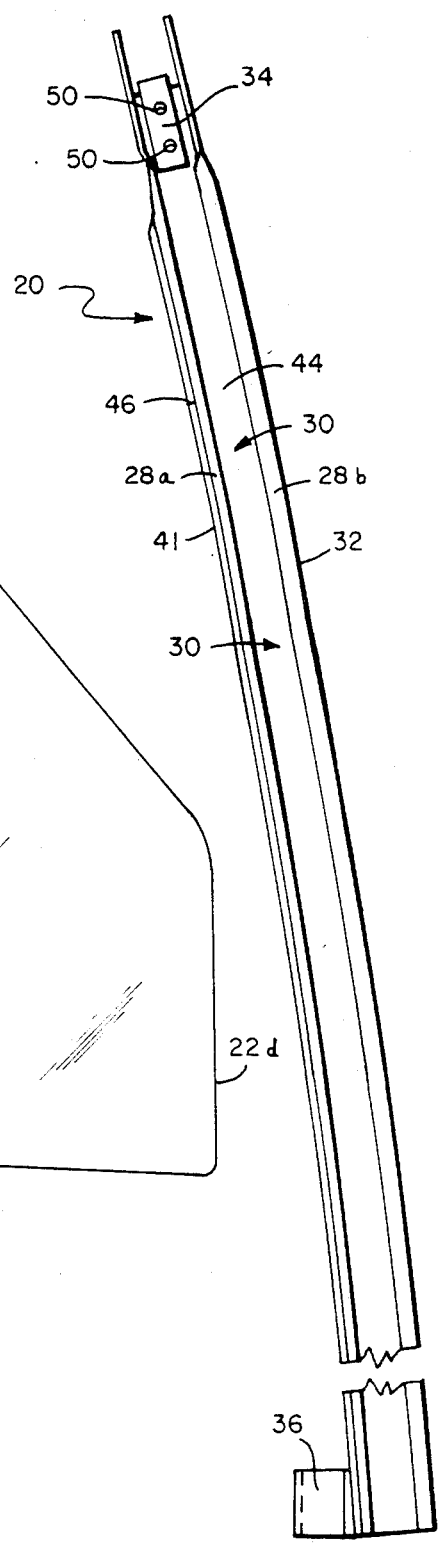
FIG. 4 is a fragmentary front elevational view of the pillar member looking into the channel.

Similarly, upper mounting bracket 34 is fixedly secured to the upper end of pillar 20, again for example by welding, and defines a pair of apertures 50 through which fasteners may be inserted to secure the pillar to frame 16. Pillar 20 has a slight transverse curvature as illustrated in FIG. 4 and defines an axial, or longitudinal, direction along its length or height and a radial, transverse, or lateral direction generally perpendicular to the axial direction.

Figure 5:
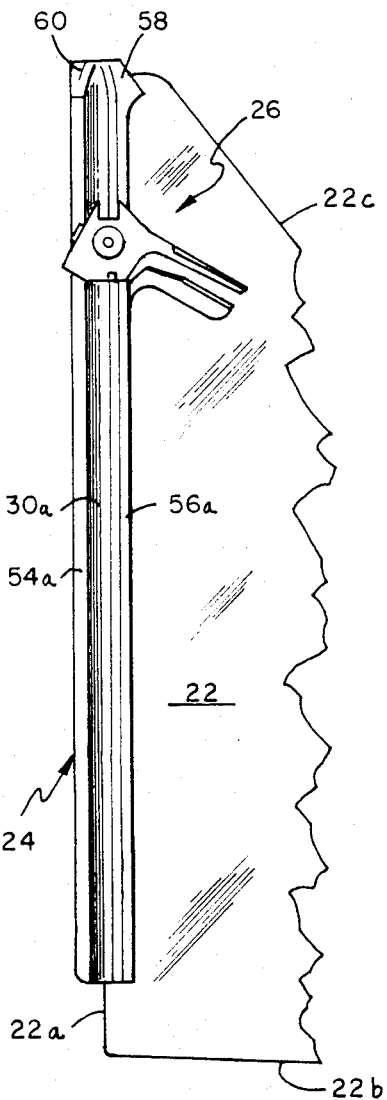
FIG. 5 is a fragmentary elevational view of the window glass and guide member and latch mechanism secured thereto.

Window glass 22 (FIGS. 2, 3, and 5) is fabricated in accordance with any method known in the art and comprises generally linear rear edge 22a, lower edge 22b generally perpendicular to edge 22a, forward angled edge 22c at an acute angle to rear edge 22a, and forward vertical edge 22d generally parallel to rear edge 22a. Alternatively, an opaque panel or decorative sheet or other generally planar member can be substituted for glass 22.

Figure 7:
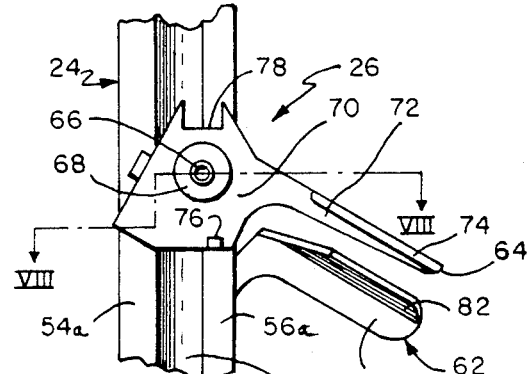
FIG. 7 is an enlarged view of the latching mechanism.
Figure 6:
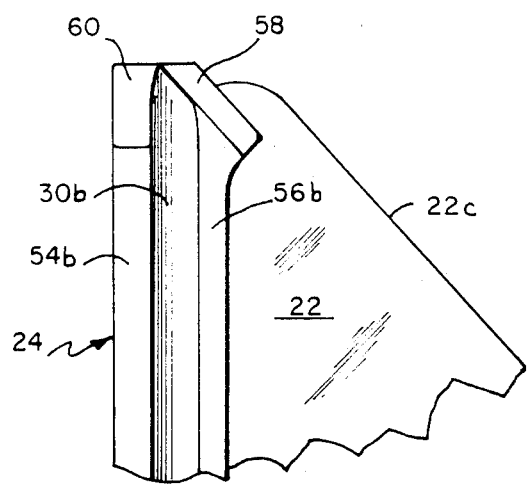
FIG. 6 is an enlarged view of the upper portion of the window glass and guide member.
Figure 8:
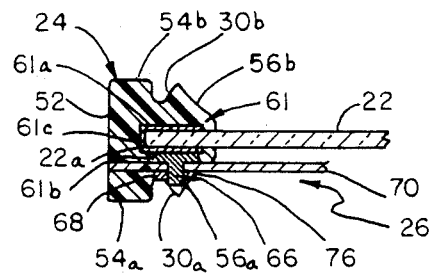
FIG. 8 is a fragmentary sectional view taken along plane VIII—VIII in FIG. 7.

Guide member 24 (FIGS. 3, 5, 6, 7, and 8) is a molded polymeric member bonded directly to glass 22 along edge 22a. Preferably, the material used in fabricating guide member 24 is a polyvinylchloride bonded to the glass as disclosed in U.S. Pat. No. 4,072,340, entitled WINDOW ASSEMBLY, issued Feb. 7, 1978, to Morgan, and U.S. Pat. No. 4,139,234, entitled WINDOW ASSEMBLY, issued Feb. 13, 1979, to Morgan. As seen in FIG. 8, guide 24 includes a rear wall 52 and sidewalls 54a and 54b extending generally perpendicularly therefrom. Grooves 30a and 30b are defined in sidewalls 54a and 54b, respectively, and are generally triangular in cross section to closely receive ribs 28a and 28b on pillar 20. Arcuate surfaces 56a and 56b extend from glass 22 to sides 54a and 54b, respectively. Edge 22a of glass 22 is located within guide 24 between sides 54 and spaced from rear wall 52. The upper end of guide 24 includes tapered surfaces 58 and 60 which cooperate with a track (not visible) in frame 16 to seal guide 24 in the frame when window glass 22 is in the fully closed position. All exposed surfaces of guide 24 (e.g., 52, 54, and 56) are flocked with polyester fibers using any method of flocking generally well known to those having ordinary skill in the art. One such method comprises applying an adhesive to guide 24, electrostatically charging the fibers, and shooting the charged fibers into the adhesive. The flocking on guide 24 facilitates movement of the guide within pillar 20.

Figure 9:
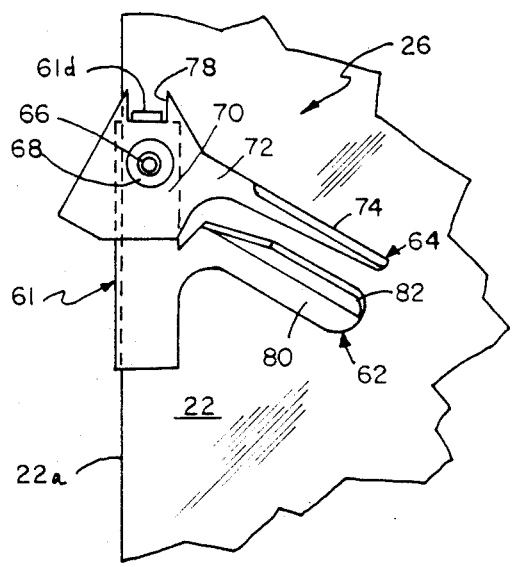
FIG. 9 is a view similar to that shown in FIG. 7, however, with the guide member removed.
Figure 10:
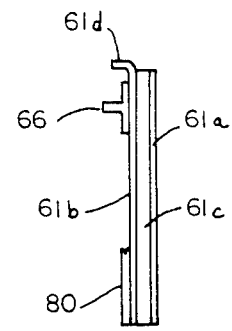
FIG. 10 is a side elevational view of the channel member of the latching mechanism.

Latching mechanism 26 (FIGS. 7-10) includes channel member 61, fixed lever arm 62 supported by the channel member, and pivotal lever arm 64 pivotally supported by the channel member. Channel member 61 is generally U-shaped in cross section including a pair of sidewalls 61a and 61b interconnected by bight wall 61c (FIGS. 8 and 10). Member 61 is bonded directly to glass 22, and more particularly about rear edge 22a to provide support for levers 62 and 64. Thus, glass 22 need not be drilled to receive the levers. An integral tab 61d extends outwardly from the upper edge of sidewall 61b (FIGS. 9 and 10) to interfit with fork 78 of lever 64 to limit pivotal movement of the lever. Lever arm 64 is pivotally supported on stud 66 which is in turn fixedly secured to channel sidewall 61b (FIG. 7). Washer 68 is secured to stud 66 to retain lever 64 on the stud. Alternatively, stud 66 can be peened to secure the lever thereon. Lever 64 includes a generally planar body portion 70 received on stud 66 and lying generally planar to glass 22. Actuating arm 72 is integral with body 70 and extends outwardly therefrom to be accessible outside of pillar 20. Flange 74 extends generally perpendicularly from arm 72 to provide a finger engagement surface for actuation of the latch mechanism. Catch or detent 76 extends generally perpendicularly from body 70 to selectively engage keeper 46 (see FIGS. 2 and 4) upon pivotal movement of body 70. Fork 78 is defined in body 70 generally opposite catch 76 to interfit with both tab 61d, groove 30a, and arcuate surface 56a to limit pivotal movement of the lever and to urge body 70 into the position shown in FIG. 7 wherein catch 76 engages keeper 46 to retain the window in its closed position. Guide 24 is cut to closely receive pivotal lever 64; however, the guide completely encapsulates channel member 61. Because guide 24 is molded of an at least somewhat resilient member, the close reception of arm 64 within guide 24 biases the lever into the position shown in FIG. 7. Fixed lever 62 includes a generally planar body 80 fixedly secured to channel member 61. Lever 62 and member 61 can be fabricated of a single piece of folded material. Further, flange 82 extends generally perpendicularly from body 80 to provide a finger-engaging surface.

OPERATION

Pillar 20 is fixedly secured within door 12 by securing brackets 34 and 36 to the door. Because guide 24 is slidably positioned within pillar 20, and more particularly within channel 30, the guide can be moved along a predetermined linear path defined by the channel. However, the guide cannot be shifted radially or transversely of the channel because of the cooperation of ribs 28 and grooves 30. Consequently, window glass 22 bonded to guide 24 also moves along a predetermined linear path between an upper closed position (illustrated in FIGS. 1 and 2) and a lowered position. Window glass 22 eliminates the need for a second track and/or a complicated movement mechanism. The close interfitting and cooperation of guide 24 within pillar 20 insures a weather-tight seal and prevents wind whistle. The interfitting of tapered surfaces 58 and 60 (see FIG. 6) on the upper end of guide 24 within frame 16 further seals the assembly within the vehicle and reduces or even eliminates any wind whistle.

When in the fully closed position, catch 76 rests on keeper 46 (FIG. 2) to maintain window glass 22 in its fully closed position. When the window is to be opened, the vehicle occupant simply presses downwardly on actuating portion 72, and more particularly flange 74, of pivotal lever 64 to pivot body 70 about stud 66 in a clockwise direction as viewed in FIG. 7. This pivotal movement disengages catch 76 from keeper 46 so that guide 24 is free to slide within pillar 20. The same downward motion exerted on lever 64 will thus urge guide 24 and window 22 downwardly within pillar 20 to lower the window. When the window is to be closed, the vehicle occupant presses upwardly on fixed lever 62 and more particularly flange 82 to raise guide 24 within pillar 20 to elevate the window to its fully closed position. As the window glides upwardly, catch 76 engages keeper 46 to pivot lever 64 in the clockwise direction as illustrated in FIG. 7 such that the catch can snap behind the keeper as the window reaches its fully closed position. Because the latching mechanism extends through molded guide 24 into channel 30, the somewhat unsightly catch portion of the latching mechanism is hidden within pillar 20 from view of the vehicle occupants. However, the actuating portion of the latching mechanism, namely arms 72 and 80 extend out of pillar 20 to be easily engageable by the vehicle occupants for actuation of the window.

It should be understood that the above description is intended to be that of a preferred embodiment of the invention. Various changes and alterations might be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A sliding panel assembly for a vehicle comprising:
   a panel including an edge;
   an elongated molded guide member bonded directly to said panel edge, said guide member extending generally the full length of said panel edge and being generally uniform in cross section throughout its length; and
   a pillar to be supported by the vehicle, said pillar defining a channel having a restricted opening, said guide member being slidably received within said channel for axial movement therein, said guide member including a weather shield positioned within said channel, said weather shield being wider than said restricted opening whereby said guide member and said pillar cooperate to permit said guide member to slide axially within said pillar and to prevent said guide member from significantly shifting transversely of said pillar, the length of said guide member facilitating ease of movement within said channel so that said panel travels in a predetermined path as said guide member slides within said pillar channel, and further whereby said guide member and said channel cooperate to form a substantially weatherproof seal extending generally the length of said panel edge.

2. A vehicle panel assembly as defined in claim 1 wherein said restricted opening is defined by a pair of opposed ribs extending inwardly on opposite sides of said restricted opening, and wherein said guide member a pair of grooves interfitting with said ribs.

3. A vehicle panel assembly as defined in claim 1 wherein said molded guide member comprises a polymeric material.

4. A vehicle panel assembly as defined in claim 3 wherein said molded guide member comprises polyvinylchloride.

5. A vehicle panel assembly as defined in claim 1 wherein said guide member is flocked with fibers at portions of the areas of said guide member engaging said pillar to facilitate movement of said guide member within said pillar.

6. A vehicle panel assembly as defined in claim 5 wherein said fibers comprise polyester fibers.

7. A vehicle panel assembly as defined in claim 4 wherein said guide member is flocked with fibers at portions of the areas of said guide member engaging said pillar to facilitate movement of said guide member within said pillar.

8. A vehicle panel assembly as defined in claim 7 wherein said fibers comprise polyester fibers.

9. A vehicle panel assembly as defined in claim 1 wherein said pillar defines a second channel for slidably receiving a second window portion.

10. A vehicle panel assembly as defined in claim 1 further comprising means for latching said window glass in a closed position.

11. A vehicle panel assembly as defined in claim 11 wherein said latch means comprises an actuator portion outside of said channel, a catch portion located inside of said channel, and a connector portion extending through said guide member between said actuator portion and said catch portion.

12. A vehicle panel assembly as defined in claim 1 wherein said pillar is fixedly mounted to the vehicle.

13. A sliding panel assembly for a vehicle comprising:
an elongated pillar supported by the vehicle, said pillar defining a channel having a restricted opening;
a panel including an edge; and
an elongated guide fixedly secured directly to said panel edge, said guide being slidably received within said pillar channel for axial movement therein, said guide member being generally uniform in cross section throughout its length, said guide including a slide portion positioned within said channel, said slide portion being wider than said restricted opening, whereby said slide portion cannot pass through said restricted opening, whereby said pillar and said guide cooperate to prevent said guide from moving transversely of said pillar, wherein the angular orientation of said window with respect to said pillar remains relatively constant during movement of said window glass as said guide slides within said channel, and further whereby said cooperating guide member and channel form a weather shield between said panel and said pillar.

14. A vehicle panel assembly as defined in claim 13 wherein said restricted opening is defined by a pair of ribs extending inwardly toward one another; and wherein said guide defines a pair of grooves interfitting with said ribs.

15. A vehicle panel assembly as defined in claim 13 wherein said guide comprises a polymeric material.

16. A vehicle panel assembly as defined in claim 15 wherein said guide is flocked with polyester fibers to facilitate movement of said guide within said channel.

17. A vehicle panel assembly as defined in claim 13 wherein said guide is flocked with polyester fibers to facilitate movement of said guide within said channel.

18. A vehicle panel assembly as defined in claim 13 wherein said pillar is fabricated of metal and roll-formed.

19. A vehicle panel assembly as defined in claim 18 wherein said pillar defines a second channel back-to-back with said first channel for receiving a second window.

20. A vehicle panel assembly as defined in claim 13 wherein said pillar defines a second channel back-to-back with said first channel for receiving a second window.

21. A vehicle panel assembly as defined in claim 13 further comprising means for latching said window glass in a closed position.

22. A vehicle panel assembly as defined in claim 21 wherein said latching means comprises:
a catch portion located within said channel;
an actuator portion located outside of said channel; and
a connector portion interconnecting said catch and actuator portions and extending through said guide, whereby said catch portion is hidden within said pillar and operable by said actuator portion located outside of said pillar.

23. A vehicle panel assembly as defined in claim 21 wherein said latching means is bonded directly to said panel.

24. A vehicle panel assembly as defined in claim 13 wherein said pillar is fixedly supported by the vehicle.

25. A latchable sliding panel assembly for a vehicle comprising:
a pillar supported by the vehicle, said pillar defining a channel;
a panel including an edge;
an elongated molded guide member bonded to said panel edge, said guide member being closely and slidably received within said pillar channel; and
a latching mechanism supported by said panel, said latching mechanism extending through said guide member and including catch means hidden within said channel for engaging said pillar and actuating means outside of said channel for actuating said catch means, whereby said catch means is substantially hidden within said pillar and can be actuated from outside of said pillar.

26. A latchable panel assembly as defined in claim 25 wherein said guide member comprises a polymeric material.

27. A latchable panel assembly as defined in claim 26 wherein said polymeric material comprises polyvinylchloride.

28. A latchable panel assembly as defined in claim 25 wherein said pillar defines a restricted channel opening more narrow than the remainder of said channel; and wherein said guide member includes an enlarged portion slidably positioned within said channel, said enlarged portion being wider than said channel opening to prevent passage of said enlarged portion through said channel opening.

29. A latchable panel assembly as defined in claim 25 wherein said pillar includes a pair of longitudinal ribs extending inwardly toward one another; and wherein said guide member defines a pair of grooves interfitting with said ribs, whereby said guide member can slide longitudinally within said channel and is prevented from pulling transversely out of said channel.

30. A latchable panel assembly as defined in claim 25 wherein said pillar comprises a roll-formed metal member.

31. A latchable panel assembly as defined in claim 25 wherein said latching mechanism is bonded directly to said panel.

32. A latchable panel assembly as defined in claim 25 wherein said actuating means is shiftable upwardly and downwardly; and wherein said pillar defines a keeper portion; and wherein said catch means comprises a catch shiftable into and out of engagement with upward and downward movement of said actuating means, whereby said panel can be lowered by urging said actuating means downwardly releasing said catch and forcing said panel downwardly.

33. A latchable panel assembly as defined in claim 32 further comprising a fixed lever supported by said panel, whereby said panel can be raised by urging said fixed lever upwardly.

34. A latchable panel assembly as defined in claim 33 wherein said fixed lever is located directly below and proximate said actuating means.

35. A latchable panel assembly as defined in claim 32 further comprising means for biasing said actuating means in said upward direction when moved in a downward direction.

36. A latchable panel assembly as defined in claim 35 wherein said biasing means comprises a portion of said latching mechanism engaging said molded guide member, whereby said guide member biases said actuating means directly.

* * * * *

UNITED STATES PATENT AND TRADEMARK OFFICE
CERTIFICATE OF CORRECTION

PATENT NO. : 4,502,248

DATED : March 5, 1985

INVENTOR(S) : John F. Thomas, Jr., et al

It is certified that error appears in the above-identified patent and that said Letters Patent is hereby corrected as shown below:

Column 3, line 32:
    "20" should be --30--; and

Column 7, line 4:
    "11" should be --10--.

Signed and Sealed this

Sixth Day of August 1985

[SEAL]

Attest:

DONALD J. QUIGG

Attesting Officer    Acting Commissioner of Patents and Trademarks